United States Patent
Kolokowsky et al.

(10) Patent No.: US 7,072,989 B1
(45) Date of Patent: Jul. 4, 2006

(54) USB PERIPHERAL DEVICE STORING AN INDICATION OF AN OPERATING POWER MODE WHEN A HOST WENT INTO HIBERNATE AND RESTARTING AT THE POWER MODE ACCORDINGLY

(75) Inventors: Stephen Henry Kolokowsky, San Diego, CA (US); Mark McCoy, San Diego, CA (US)

(73) Assignee: Cypress Semiconductor, Inc., San Jose, CA (US)

( * ) Notice: Subject to any disclaimer, the term of this patent is extended or adjusted under 35 U.S.C. 154(b) by 6 days.

(21) Appl. No.: 10/850,286

(22) Filed: May 19, 2004

Related U.S. Application Data

(63) Continuation-in-part of application No. 10/260,081, filed on Sep. 27, 2002.

(60) Provisional application No. 60/483,506, filed on Jun. 26, 2003.

(51) Int. Cl.
*G06F 13/10* (2006.01)

(52) U.S. Cl. .............................. 710/8; 710/14; 710/19; 713/300

(58) Field of Classification Search .................. 710/8, 710/10, 14, 15, 18, 19; 713/1, 300, 310, 330
See application file for complete search history.

(56) References Cited

U.S. PATENT DOCUMENTS

| | | | |
|---|---|---|---|
| 5,675,813 A * | 10/1997 | Holmdahl | 713/310 |
| 5,905,389 A | 5/1999 | Alleven | 327/108 |
| 5,912,569 A | 6/1999 | Alleven | 327/108 |
| 5,929,664 A | 7/1999 | Alleven | 327/108 |
| 5,974,486 A | 10/1999 | Siddappa | |
| 5,987,617 A | 11/1999 | Hu et al. | |
| 6,012,103 A | 1/2000 | Sartore et al. | |
| 6,040,792 A | 5/2000 | Watson et al. | 341/100 |
| 6,073,193 A | 6/2000 | Yap | 710/100 |
| 6,124,750 A | 9/2000 | Alleven et al. | 327/394 |
| 6,178,514 B1 * | 1/2001 | Wood | 713/300 |
| 6,389,494 B1 | 5/2002 | Walton et al. | 710/317 |
| 6,541,879 B1 | 4/2003 | Wright | 307/31 |
| 6,611,552 B1 | 8/2003 | Beck | |

(Continued)

FOREIGN PATENT DOCUMENTS

JP 2002-202856 A 7/2002

OTHER PUBLICATIONS

USB Promoters Group, Universal Serial Bus specification, Revision 2.0, Apr. 27, 2000, pp. 1–650.

Intel Developer Forum; *Intel Release USB 2.0 Enhanced Host Controller Interface 1.0 Specification, EHCI Compliance–Testing Program;* Tokyo, Apr. 17, 2002; 2 pages.

English Language Abstract of Japan Publication No. 2002–202856 Jul. 19, 2002; Takayuki.

*Primary Examiner*—Ilwoo Park
(74) *Attorney, Agent, or Firm*—Marger Johnson & McCollom, P.C.

(57) ABSTRACT

A device capable of operating at both a low power mode and at a high power mode which is connected to a host by a USB connection. The device includes a non-volatile memory which stores the operating state of the device when the host goes into hibernate mode and a flag which indicates that the host has entered the "hibernate" mode. When the device powers up, the previous state of the device is read from the memory. If the previous state was high power and the hibernate flag is set, the device restarts in high power mode without the need of any initialization to determine if the host will allow operation at high power speed mode. The device determines that the host is going into suspend mode (rather than power down mode) by determining if a suspend signal on the USB bus is followed by a power down operation.

20 Claims, 4 Drawing Sheets

U.S. PATENT DOCUMENTS

| | | | |
|---|---|---|---|
| 6,625,761 B1 | 9/2003 | Sartore et al. | 714/43 |
| 6,665,801 B1 * | 12/2003 | Weiss | 713/300 |
| 6,665,810 B1 | 12/2003 | Sakai | |
| 6,671,831 B1 | 12/2003 | Sartore et al. | 714/44 |
| 6,691,201 B1 | 2/2004 | Williams et al. | 710/315 |
| 6,738,834 B1 | 5/2004 | Williams et al. | |
| 6,754,725 B1 | 6/2004 | Wright et al. | 710/8 |
| 6,813,672 B1 | 11/2004 | Kamran et al. | 710/305 |
| 6,820,160 B1 | 11/2004 | Allman | 710/305 |
| 6,839,778 B1 | 1/2005 | Sartore et al. | 710/60 |
| 2002/0162035 A1 * | 10/2002 | Tsukihashi | 713/300 |
| 2002/0162036 A1 | 10/2002 | Kim et al. | |
| 2003/0054703 A1 | 3/2003 | Fischer et al. | |
| 2003/0110403 A1 * | 6/2003 | Crutchfield et al. | 713/300 |
| 2004/0221180 A1 * | 11/2004 | Enami et al. | 713/300 |

* cited by examiner

USB PERIPHERAL DEVICE STORING AN INDICATION OF AN OPERATING POWER MODE WHEN A HOST WENT INTO HIBERNATE AND RESTARTING AT THE POWER MODE ACCORDINGLY

RELATED APPLICATION

1) The present application is a non-provisional application of provisional application Ser. No. 60/483,506 filed Jun. 26, 2003.

2) The present application is a continuation in part of application Ser. No. 10/260,081 filed Sep. 27, 2002 and now pending.

Priority of the above two, previously filed, applications is hereby claimed. The above two applications are hereby incorporated herein in their entirety.

FIELD OF THE INVENTION

This invention relates to computer systems, and more particularly, to devices connected to a computer using a Universal Serial Bus (USB) connection.

BACKGROUND OF THE INVENTION

An important aspect of many computer systems is the interface between the computer central processing unit and various external devices. In many computer systems, the various units in the system are designed and manufactured by more than one company or organization. Various standard interfaces have been defined to facilitate connection units together to form a system. The Universal Serial Bus interface (USB) has come into widespread use for connecting peripheral devices to a computer system.

A document entitled "Universal Serial Bus Specifications, Revision 2.0" defines the USB 2.0 standard. This widely available document can, for example, be obtained from a non-profit corporation known as the USB Implementers Forum, Inc. (USB-IF). USB-IF authorizes companies to affect a particular label to products that pass various USB-IF Compliance Programs. The "Universal Serial Bus specification, revision 2.0 is hereby incorporated herein in its entirety.

The USB specification defines three operating speeds for devices connected by a USB connection. These three speeds are termed "low", "full" and "high". The present invention is only related to the "full" and "high" speeds. The USB specifications also defines that devices may be low power devices drawing up to 100 mA of power from the USB connection or high power devices drawing up to 500 mA of power from the USB connection.

Co-pending application Ser. No. 10/260,081 (the content of which is hereby incorporated herein by reference) describes a method and device whereby a device first connects using the full speed mode and drawing less than 100 mA of power. At this speed, a determination is made as to whether or not a connection can be made at the high speed mode which requires high power. If a connection can be made at the high power, high speed mode, a transition is made to high speed, high power mode.

Some systems such as the Microsoft Windows™ operating system have a "hibernate mode" which turns off power to peripheral devices and which save an image of the system's state. Later the system can be re-started and continue from the state of the system prior to the "hibernate" operation.

The present invention provides a method and system whereby a device, capable of operation in either full speed mode (drawing less than 100 mA of power) or in high speed mode (requires a high power connection) can automatically reconnect in high speed mode after a hibernate operation.

SUMMARY OF THE INVENTION

With the present invention a peripheral device capable of operating in either full speed mode (which requires less than 100 mA of power) or high speed mode (which requires more than 100 mA but less than 500 mA of power) is connected to a host by a USB connection. The device includes a non-volatile memory which stores the operating state of the device when the host goes into hibernate state. The operating states are stored as "low power" (that is, full speed), "high power" (that is high speed) and "unplugged". A flag is also stored to indicate that the host has entered the "hibernate" mode. When the device powers up, the previous state of the device is read from the non-volatile memory. If the previous state was high power and the hibernate flag is set, the device restarts in high power (at high speed) mode without the need of any initialization to determine whether or not the host will allow the device to operate in at high speed and high power mode.

The device determines that the host is going into hibernate mode (rather than into another power down mode) by determining if a suspend signal on the USB bus is followed by a power down.

DETAILED DESCRIPTION OF PREFERRED EMBODIMENTS

Figure 1:
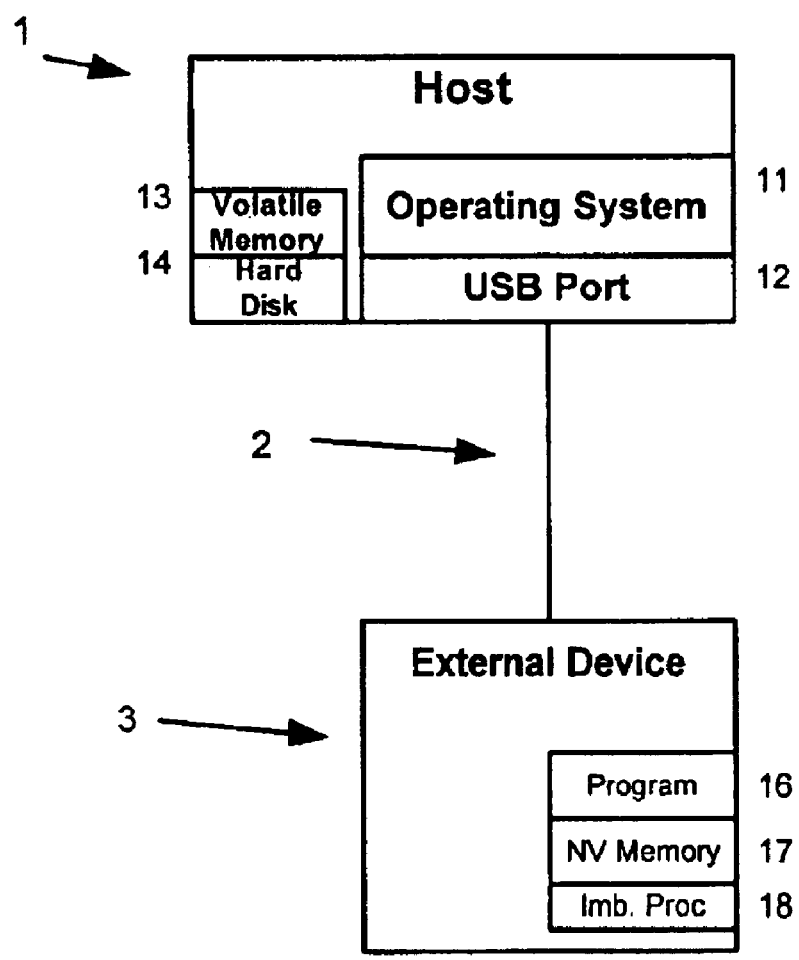
FIG. 1 is an overall system diagram.

An overall block of a preferred embodiment of the invention is shown in FIG. 1. In this embodiment, a host computer 1 is connected to a peripheral device 2 by a USB cable 3. The host computer may be a commercially available personal computer. The host computer has an operating system 11, a USB port 12, a volatile memory 13, and a hard drive 14. The USB cable 2 connects USB port 12 on host computer 1 to the peripheral device 3. The USB cable 2 has the standard D+, D−, VBUS and Ground lines.

The peripheral device 3 includes an imbedded processor 18 a non-volatile memory 17 and a computer program 16. Information that is stored in non-volatile memory 17 is retained even if power to the device is terminated. The embedded processor 18 that is part of peripheral device 3, can perform various operations under the control of a program 16 which is stored in the peripheral device.

The host computer 10 also has various other components which are normally part of a personal computer. For example, host 1 may include a display, a keyboard and a pointing device such as a mouse. These normal components are not specifically shown in FIG. 1. The various normal parts of a personal computer are considered as integral parts of host computer 10 which is specifically show in FIG. 1.

In the embodiment described herein, the operating system 11 is the Windows 2000™ operating system marketed by Microsoft Corporation of Redmond Wash. Alternatively the operating system 11 may, for example, be a different version of the Microsoft Widows operation system, provided that the particular version includes a "hibernate" mode.

All of the Windows operating systems marketed by Microsoft Corporation, after the Windows 98™ operating system include a hibernate mode. Thus, as an alternative to the Windows 2000 operating system, the operating system 11 can be any of the relatively newer Microsoft Windows operating systems that includes a hibernate mode.

The hibernate mode is a power saving mode. Furthermore, the hibernate mode facilitates a quick way to re-start a system. When a system is put into hibernate mode, the system saves an image of the active memory on a hard disk. When the processor is re-started, the stored image is loaded into memory. Thus, various initialization steps normally performed when a system is started are by-passed. Using the hibernate mode, a system can resume operation from the point where operations were previously terminated.

The present invention is directed to handling the situation that occurs with certain peripheral devices when the host goes into hibernate mode and the host is later restarted. Co-pending applications Ser. No. 10/260,081 describes a system with a peripheral device that starts in a low power, full speed mode and that later changes to a high power, high speed mode if sufficient power is available on the USB connection. As described in the referenced co-pending application, the peripheral device begins operating is the low power, full speed mode, and while operating in this mode, the peripheral device determines if there is sufficient power available for the device to switch to the high power, high speed mode.

It is noted that a device connected to a host by a USB port may be either a low power device (drawing less than 100 mA of power) or a high power device (drawing not more than 500 mA of power). A high power device can only connect to a particular USB port, if during the initialization process, the host indicates that the particular port has up to 500 mA of power available. The peripheral device 3 can operate in full speed mode, drawing less than 100 mA of power, or it can operate at high speed, in which case it must be able to draw up to 500 mA of power from the USB port.

Figure 3:
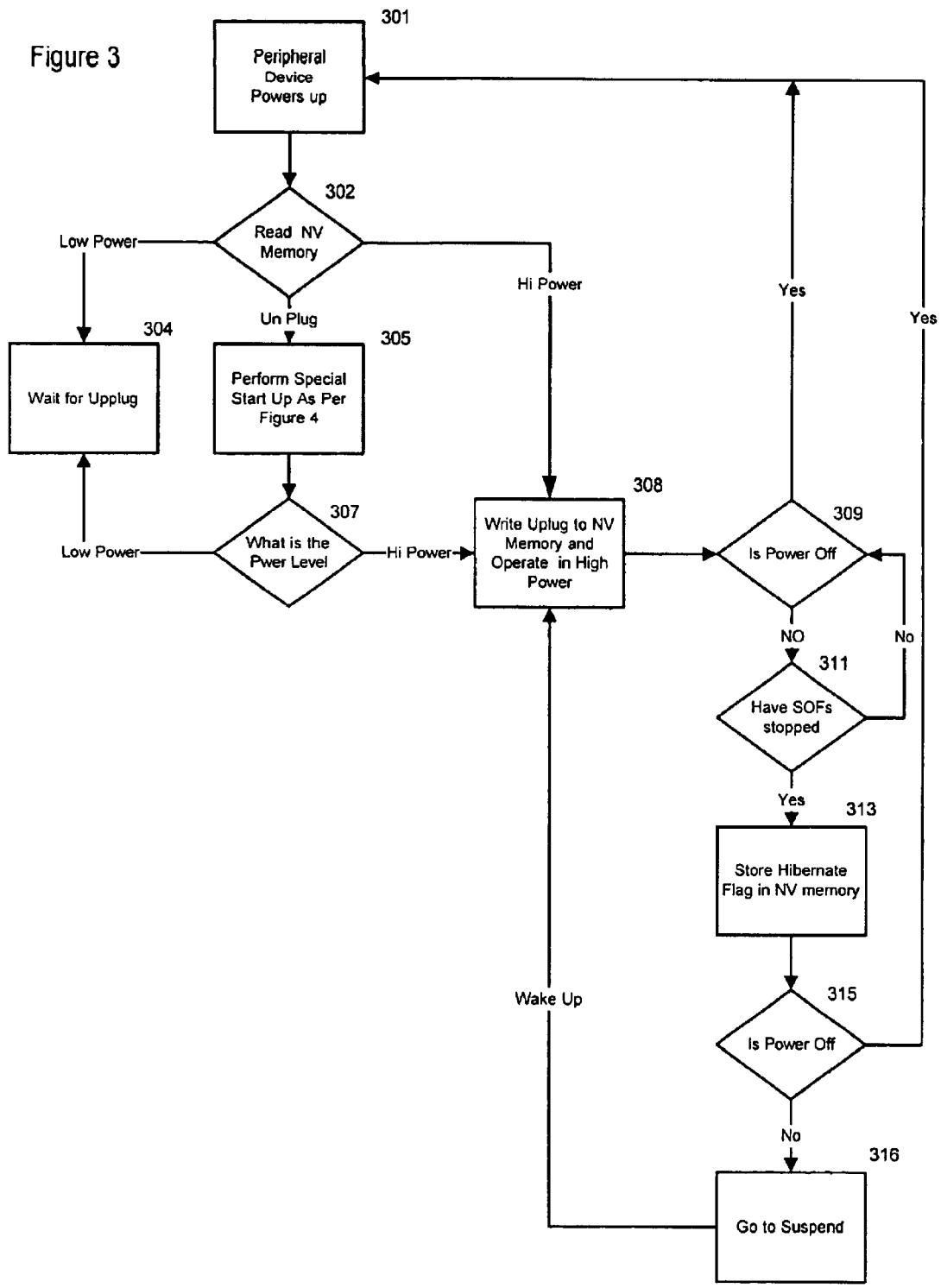
FIG. 3 is a detailed flow diagram of the operation of the system.
Figure 4:
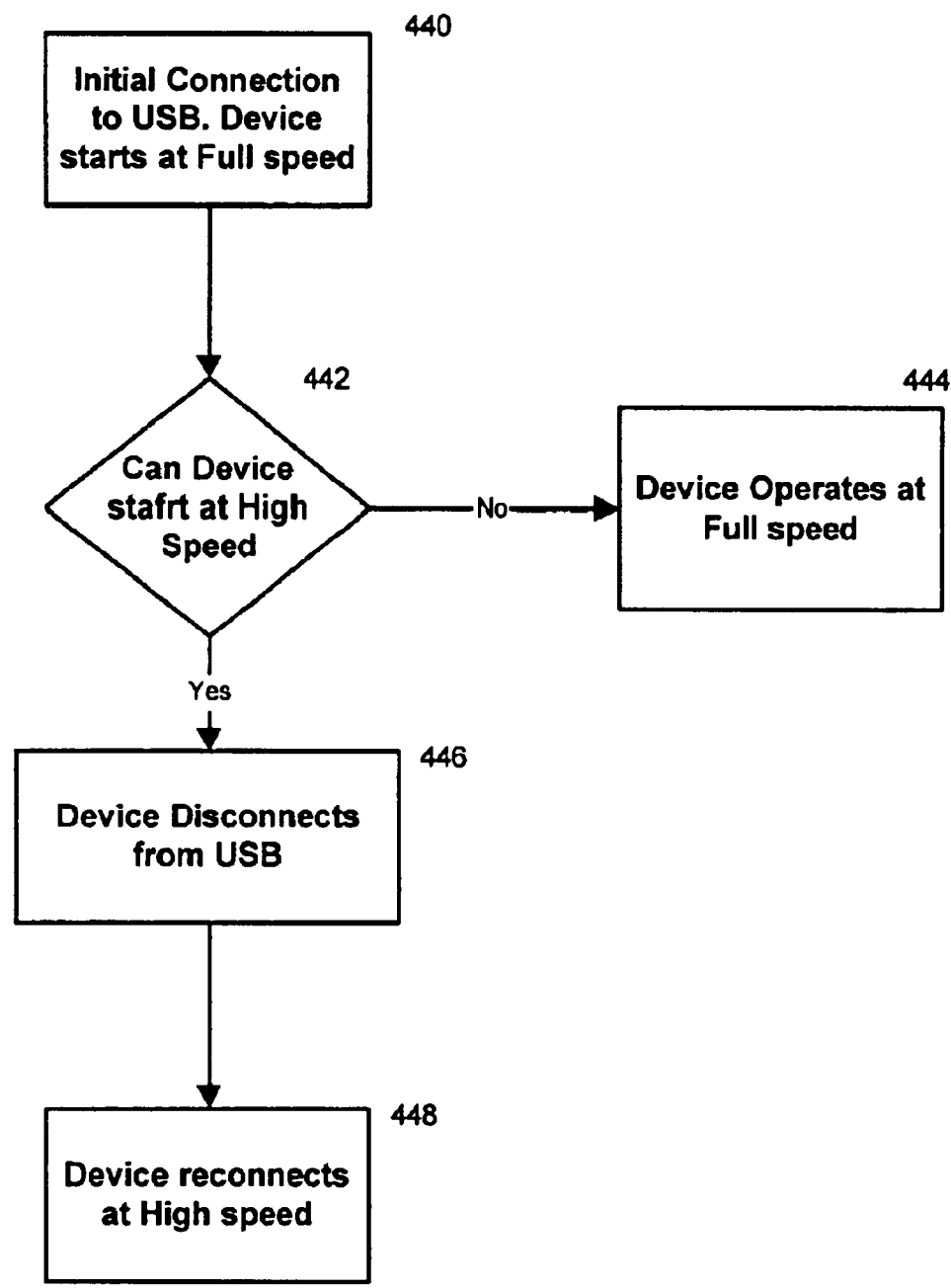
FIG. 4 is a flow diagram of the operations performed to determine if the device can power up in high speed mode.

The present invention is directed to the situation where, with such a device connected, the system goes into hibernate mode. The overall operations that occur with the present invention are shown by the flow diagram in FIG. 2. It should be understood, that FIG. 2 does not show all the alternative paths that a system might follow. The detailed flow diagram in FIGS. 3 and 4 show the various alternative paths.

Figure 2:
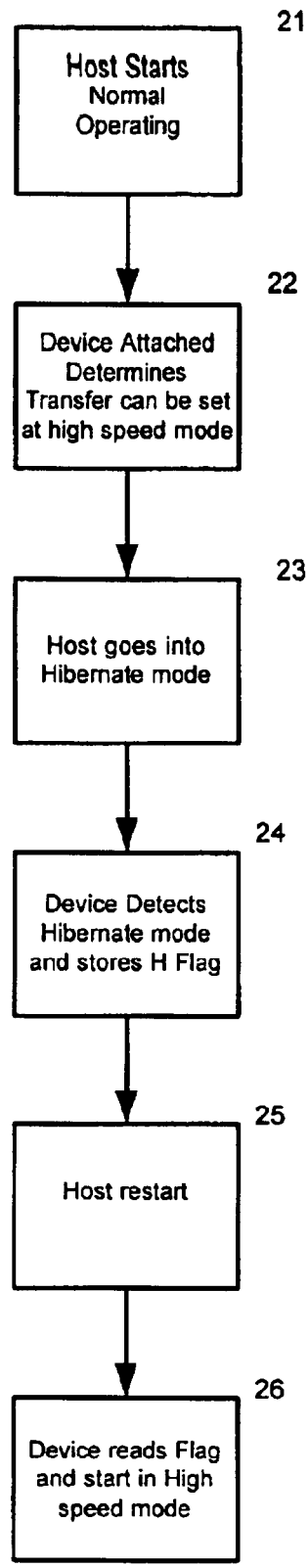
FIG. 2 is a block diagram showing the overall operation of the system.

The sequence of steps shown in FIG. 2, begins with the host processor 1 operating normally as indicated by block 21. Next as indicated by block 22 a device (such as device 3) is attached to the USB port of the processor. The device, is a device that can operate at the high speed mode, but operating in this mode it requires high power. This device utilizes the process described in co-pending application Ser. No. 10/260,081 to determine if the device can operate in the high speed, high power mode. In the sequence shown, the device uses the process described in co -pending application Ser. No. 10/260,081 to determine that it can operate at the high speed, high power mode.

Next as indicated by block 23, the host 1 is placed in hibernate mode. When the host 1 goes into hibernate mode, an image of the active volatile memory 13 is stored on a hard disk 14 (see FIG. 11). Thus the memory image is preserved when power to the host is terminated. When the host 1 goes into hibernate mode, it first suspends the USB bus and next it removes power from the bus. It is noted that if the host is shutting down, it will not suspend the USB bus prior to removing power. The peripheral device detects the sequence (suspend USB followed by power off) to determine that the host is going into hibernate mode rather than that the host is shutting down. An explanation is given later concerning what happens if in some circumstances the sequence described above does not occur.

As indicated by block 24, the peripheral device 3 detects the sequence that indicates that the host 1 is going into hibernate mode and the peripheral device stores a flag in the non-volatile memory 14 to indicate that the processor went into hibernate mode.

After some time the host processor 1 will be re-started as indicated by block 25. When the host 1 is restarted (after it has been placed in hibernate mode) the processor reads the stored memory image from the hard drive 14 and places this image in its volatile memory 13. Thus processor 1 can begin operating from the exact point where the processor was prior to going into hibernate mode.

The peripheral device 3 now comes back online. It detects the hibernate flag (and the other information) stored in its non-volatile memory and it can immediately begin operating in high power, high speed mode. At this point, the peripheral device 3 need not utilize the technique shown in co-pending applications Ser. No. 10/260,081 to determine that it can operate in high speed, high power mode. It is noted that in the step indicated by block 24, the peripheral device 3 did use the technique shown in co-pending applications Ser. No. 10/260,081 to determine that it could operate at the high power, high speed mode.

FIG. 3 is a more detailed block diagram of the process performed by peripheral device 3. As can be seen from block diagram in FIG. 3, the device detects when the host goes into hibernate mode and when this transition is detected, the device stores in non-volatile memory an indication that the host has transitioned to hibernate mode and an indication of whether the device 3 was operating in high speed or full speed mode when the host transitions to hibernate mode.

The process begins when the device enters a power up state as indicated by block 301. At this time the peripheral device 3 transitions from an un-powered state to a powered state.

Next as indicated by block 302, the nonvolatile memory 17 is then read. As will be seen later the nonvolatile memory 17 has stored therein an indication of the previous state of the peripheral device.

Based on the data stored in the nonvolatile memory 17, the peripheral device 3 does one of the following:

1) If the previous state was "low-power" the device goes to the operations in block 304.
2) If the previous state was "unplug", the peripheral device goes to block 305.
3) If the previous state was "hi-power" the peripheral device goes to block 308.

If the previous state was low power and the peripheral device goes to block 304, the device waits for an unplug operation. That is, peripheral device 3 either enters a low-power mode of operation or stops operating entirely.

If the previous state was "unplug", the peripheral device enters block 305. At this point the device need determine whether or not it can operate in the high speed, high power mode. In order to do this the peripheral device performs the startup routine shown in FIG. 4 and described later. The start up operations shown in FIG. 4 are the type of operations described in detail in co-pending application Ser. No.

10/260,081 the content of which is hereby incorporated herein in its entirety.

After performing the start up operations indicated by block 305, the power state is checked as indicated by block 307. The method shown in FIG. 4 has two possible outputs depending on the host's power selection. If the host selects the high-power configuration, the peripheral device 3 performs the operations indicated by block 308. If the operations in block 305 result in the low-power configuration, the peripheral device enters block 304. If the operations of block 305 does not result in the selection of a power level (that is, if the host never selects a configuration) the device is effectively in block 304.

If the device goes to the operations specified by block 308, an "unplug" code is written to the non-volatile memory 17. At this point the peripheral device is in effect preparing for a surprise power removal. If a surprise removal occurs, the device may lose power before it has enough time to update the state flag in the non-volatile memory. For this reason, the flag in the non-volatile memory is kept in the "unplug" state until another state is detected.

After the non-volatile memory has been updated as indicated by block 308, the operations moves to those indicated by block 309. If the power is not off, (that is,if power is still on) a check is made, as indicated by block 311, to determine if the Start of Frame signals (SOFs) have stopped.

When the peripheral device is unplugged from the USB, it will lose power (VBUS) and the process will return to block 301 when power is reapplied. Since the "unplug" state was written in block 308, the device will follow the algorithm shown in FIG. 4 (and in co-pending application Ser. No. 10/260,081) again on startup. If power remains, but SOFs (Start of Frame) stop the device is either entering the suspend state (indicated by 3 consecutive 1 ms frames without SOFs) or hibernate (power removal) states.

The hibernate state is detected by a very particular action performed by the host operating under the Windows operation system. When the host is entering hibernate, it will suspend the USB bus, and then remove power. When the host is shutting down, it will not suspend the USB bus before shutting down power.

As indicated by block 313, the "hibernate" state flag is stored in the non-volatile memory 17. Once the peripheral device has detected that the host is going into the hibernate state, it quickly stores the "hibernate" flag into non-volatile memory before the host removes power. As indicated by block 315, a check is performed to determine if power off has occurred. If the host 1 removes power at this point, the peripheral device is in the S4 state. If the host 1 continues to provide power to the peripheral device, the host is in the S3 state. In either one of these cases, the peripheral device 3 will resume as a high-power device when the SOFs restart. In the S3 case, the peripheral device will lose power and pass through block 301, read high-power from the non-volatile memory and restart as a high-power device.

As indicated by block 316, if power is not off, the peripheral device goes to suspend mode. In the suspend mode, the peripheral device will wake up when SOFs resume and the process will return to the step indicated by block 308.

The special start up process indicated by block 305 is shown in more detail in FIG. 4. The overall purpose of the operations indicated by block 305, is to determine if a particular USB connection is such that it can support a high speed connection which draws up to 500 milliamps (mA) or if a particular connection can only support a low power, full speed connection which draws up to 100 mA of power. The overall operations performed to make this determination are shown in FIG. 4. A more detailed description of the operations indicated by block 305 is given in co-pending application Ser. No. 10/260,081, the content of which is incorporated herein by reference.

The operations shown in FIG. 4 are the following. As indicated by block 440, when the peripheral device is initially connected to the SB port, the device begins operating at the full speed mode. In this mode the device draws 100 mA of power from the USB connection.

Next as indicated by block 442, a check is made to determine if the connection is such that the device can draw 500 mA of power from the USB connection. If the connection is such that the peripheral device cannot draw 500 mA, the device continues to operate at the low power, full speed mode as indicated by block 444.

If the check indicated by block 442 indicates that the connection is such that the device can in fact draw 500 Ma of power from the USB connection, the device first disconnects from the USB as indicated by block 46. Then the device reconnects at the high speed, high power mode as indicated by block 448.

A more detailed explanation of the operation shown in FIG. 4 are given co-pending application Ser. No. 10/260,081. It is noted that the content of application Ser. No. 10/260,081 is incorporated herein by reference.

It is also noted that an alternate embodiment utilizes a different method to detect when the host performs an unplug operation versus a suspend operations. In this alternate embodiment the device power supply is separated from the VBUS line in the USB connection using a regulator (or similar type of circuit). The regulator (or alternative circuit) provides enough energy to power the USB device through a non-volatile RAM update cycle when a loss VBUS power is detected. This provides an alternate means of distinguishing between S4 suspend and unplug.

It is noted that advantages of all the embodiments described above, include the ability to detect hibernate, unplug, and power down states without driver assistance. In addition, the port power information is retained through the power-down process, and the retained port power information is used for power adjustment.

The embodiments described above include a host operating under the Windows operating system. Other alternative embodiments include host operating under various other types of operating systems that include a hibernate mode.

It is noted that the published specification of the Windows operating system does not specify that the sequence, suspend USB followed by power off, must occur when the system is going into hibernate mode. The Windows specification merely specifies that a signal is provided for peripheral drivers when the host is going into hibernate mode. It has, however, been empirically determined that Windows does provide the sequence of signals, suspend USB followed by power off, when the host is going into suspend mode. The embodiment described above does not use the special signal provided by windows and instead it detects the sequence, suspend USB followed by power off, to determine that the host is going into hibernate mode. If in some circumstances a host goes into hibernate without the particular sequence (suspend USB followed by power off) occurring the embodiment described above will merely follow the sequence described in the referenced co-pending application Ser. No. 10/260,081 to begin operations when power-up occurs.

It is also noted that the terms low power, full speed and high power, high speed are terms that refer to the two modes of operation specified by the publicly available USB 2 specifications. As used herein with respect to the embodiments described, the terms, "low power" and "full speed" are used synonymously and they refer to the same mode of operation. They are sometimes used together for emphasis and to avoid confusion. Likewise the terms "high power" and "high speed" are used synonymously and they refer to the same mode of operation. They are sometimes used together for emphasis and to avoid confusion. In some peripheral devices (not specifically shown herein) a device may be low power without being full speed and a device may be high power without being high speed. It is the host and the USB port that determines if enough power is available for a device connected to a particular port to operate in high power mode.

While the invention has been shown and described with respect to preferred embodiments thereof, it should be understood that various changes in form and detail can be made without departing from the spirit and scope of the invention. The scope of the invention is limited only by the appended claims.

We claim:

1. A method of operating a peripheral device connected to a host via a Universal Serial Bus (USB), said device being able to operation at either low power mode or high power mode, said method including:
   detecting when the host goes into a hibernate mode, and when said host re-starts after hibernate mode,
   when said host goes into hibernate mode, saving in a non-volatile memory an indication that the host went into hibernate,
   when said host goes into hibernate mode, saving in non-volatile memory an indication of whether the device was operating at low power mode or high power mode when the host went into hibernate mode,
   when said host restarts after going into hibernate mode, restarting said device at high power mode if said device was in high power mode when said host went into hibernate mode, and
   when said host restarts after going into hibernate mode, restarting said device at low power mode if said device was in low power mode when said host went into hibernate mode.

2. The method recited in claim 1 wherein said system is operating in accordance with the MS Windows™ operating system.

3. The method recited in claim 2 wherein said MS Windows™ operating system has a hibernate mode.

4. The method recited in claim 1 wherein when said device is initially powered up, it detects if the connection is capable of handling a high speed mode, or if the device must operate at full speed.

5. The method recited in claim 1 wherein said peripheral device determines that said host is going into hibernate mode by detecting in sequence a suspend command from the host followed by a power off command.

6. The method recited in claim 1 wherein said peripheral device operates at full speed in said low power mode.

7. The method recited in claim 1 wherein said peripheral device operates at high speed in said high power mode.

8. The method recited in claim 1 wherein said system is operating in accordance with an MS Windows™ operating system and said MS windows operating system has a hibernate mode.

9. The method recited in claim 1 wherein said host issues a suspend command host followed by a power off command prior to going into hibernate mode.

10. The method recited in claim 9 wherein said peripheral device determines that said host is going into hibernate mode by detecting in sequence a suspend command followed by a power off command.

11. A peripheral device adapted for connection to a host via a Universal Serial Bus (USB), said peripheral device capable of operating at both a low power mode and a high power mode, said peripheral device including the combination of;
   a non-volatile memory means for storing an indication that the host has gone into hibernate mode and an indication of the power mode at which said peripheral device was operating when said host went into hibernate mode,
   means operable when said host is restarted after having gone into hibernate mode for re-starting said peripheral device in high power mode if said device was operating in high power mode before said host went into hibernate mode and for starting said peripheral device in low power mode if said device was operating in low power mode when said host went into hibernate mode.

12. The device recited in claim 11 wherein said host issues a suspend command on said USB bus is followed by a power down command prior to going into hibernate mode.

13. The device recited in claim 12 including means for determining that said host is going into hibernate mode by determining if a suspend command on said USB bus is followed by a power down command.

14. The device recited in claim 11 wherein said host is operating in accordance with the MS Windows™ operating system.

15. The device recited in claim 11 wherein said device operates at full speed in said low power mode and said device operates at high speed in said high power mode.

16. A method of operating a peripheral device connected to a host via a Universal Serial Bus (USB), said host having a hibernate mode, said peripheral device being able to operation at either low power mode or high power mode, said method including:
   detecting when the host goes into a hibernate mode,
   saving in a non-volatile memory an indication that the host went into hibernate,
   saving in non-volatile memory an indication of whether the device was operating at low power mode or high power mode when said host went into hibernate mode,
   when said host restarts after going into hibernate mode, restarting said device at high power mode if said device was in high power mode when said host went into hibernate mode, and
   when said host restarts after going into hibernate mode, restarting said device at low power mode if said device was in low power mode when said host went into hibernate mode.

17. The method recited in claim 16 wherein said system is operating in accordance with the MS Windows™ operating system.

18. The method recited in claim 17 wherein said MS Windows™ operating system has a hibernate mode.

19. The method recited in claim 16 wherein said host issues a suspend command host followed by a power off command prior to going into hibernate mode.

20. The method recited in claim 19 wherein said peripheral device determines that said host is going into hibernate mode by detecting in sequence a suspend command from the host followed by a power off command.

* * * * *